(12) United States Patent
Fuke et al.

(10) Patent No.: US 11,654,656 B2
(45) Date of Patent: May 23, 2023

(54) REINFORCEMENT SHEET, REINFORCEMENT MEMBER, REINFORCEMENT KIT, PRODUCING METHOD OF REINFORCEMENT SHEET, AND PRODUCING METHOD OF REINFORCEMENT MEMBER

(71) Applicant: NITTO DENKO CORPORATION, Osaka (JP)

(72) Inventors: Kazuhiro Fuke, Osaka (JP); Masatsugu Koso, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/649,828

(22) PCT Filed: Sep. 28, 2018

(86) PCT No.: PCT/JP2018/036423
§ 371 (c)(1),
(2) Date: Mar. 23, 2020

(87) PCT Pub. No.: WO2019/066023
PCT Pub. Date: Apr. 4, 2019

(65) Prior Publication Data
US 2020/0282703 A1 Sep. 10, 2020

(30) Foreign Application Priority Data

Sep. 29, 2017 (JP) .............................. JP2017-191287

(51) Int. Cl.
*B32B 15/14* (2006.01)
*B32B 5/02* (2006.01)
(Continued)

(52) U.S. Cl.
CPC ................ *B32B 15/14* (2013.01); *B32B 5/02* (2013.01); *B32B 5/022* (2013.01); *B32B 5/12* (2013.01);
(Continued)

(58) Field of Classification Search
CPC ........... B32B 15/14; B32B 5/022; B32B 5/12; B32B 15/092; B32B 5/02; B32B 5/26;
(Continued)

(56) References Cited

U.S. PATENT DOCUMENTS

2010/0098910 A1 4/2010 Naritomi et al.
2010/0159196 A1 6/2010 Naritomi et al.

FOREIGN PATENT DOCUMENTS

JP H02-169658 A 6/1990
JP H07-124981 A 5/1995
(Continued)

OTHER PUBLICATIONS

Machine Translation of JP 2005-161852 A. (Year: 2005).*
(Continued)

*Primary Examiner* — Brian Handville
(74) *Attorney, Agent, or Firm* — Edwards Neils LLC; Jean C. Edwards, Esq.

(57) ABSTRACT

A reinforcement sheet for reinforcing a metal plate by adhering to the metal plate includes a core material layer containing a resin and a filler, and a front layer disposed at one side in a thickness direction of the core material layer. A content ratio of the filler in the core material layer is 15 mass % or more and below 85 mass %, and the front layer is obtained by laminating a plurality of unidirectional fiber resin composite sheets.

8 Claims, 5 Drawing Sheets

(51) Int. Cl.
| | |
|---|---|
| *B32B 5/26* | (2006.01) |
| *B32B 7/12* | (2006.01) |
| *B32B 27/20* | (2006.01) |
| *B32B 27/38* | (2006.01) |
| *B32B 5/12* | (2006.01) |
| *B32B 15/092* | (2006.01) |

(52) U.S. Cl.
CPC ............... *B32B 5/26* (2013.01); *B32B 7/12* (2013.01); *B32B 15/092* (2013.01); *B32B 27/20* (2013.01); *B32B 27/38* (2013.01); *B32B 2260/023* (2013.01); *B32B 2260/046* (2013.01); *B32B 2262/101* (2013.01); *B32B 2262/106* (2013.01); *B32B 2264/102* (2013.01)

(58) Field of Classification Search
CPC .......... B32B 7/12; B32B 27/20; B32B 27/38; B32B 2264/102; B32B 2260/023; B32B 2260/046; B32B 2262/101; B32B 2262/106; B32B 7/02; B32B 15/08; B32B 27/04
See application file for complete search history.

(56) References Cited

FOREIGN PATENT DOCUMENTS

| | | |
|---|---|---|
| JP | 2005-161852 A | 6/2005 |
| JP | 2010-058394 A | 3/2010 |
| JP | 2012-082394 A | 4/2012 |
| WO | 2008/114669 A | 9/2008 |
| WO | 2008/126812 A1 | 10/2008 |

OTHER PUBLICATIONS

International Search Report Issued in PCT/JP2018/036423 dated Nov. 27, 2018.
Written Opinion Issued in PCT/JP2018/036423 dated Nov. 27, 2018.
International Search Report Issued in PCT/JP2018/036422 dated Nov. 27, 2018.
Written Opinion Issued in PCT/JP2018/036422 dated Nov. 27, 2018.
Office Action, issued by the European Patent Office dated Jun. 24, 2021, in connection with corresponding European Patent Application No. 18863464.6.
Office Action, issued by the European Patent Office dated May 27, 2021, in connection with corresponding European Patent Application No. 18863465.3.
Office Action, dated Oct. 21, 2021, in connection with U.S. Appl. No. 16/649,827.
Office Action, which was issued by the State Intellectual Property Office dated Sep. 8, 2021, in connection with corresponding Chinese Patent Application No. 201880063337.3.
Office Action, which was issued by the State Intellectual Property Office dated Sep. 9, 2021, in connection with corresponding Chinese Patent Application No. 201880063425.3.
Failure Analysis, ed. Ho Yuhuai, pp. 208-209, National Defense Industry Press, Mar. 2017, Beijing.
Office Action, which was issued by the State Intellectual Property Office dated Mar. 8, 2022, in connection with Chinese Patent Application No. 201880063337.3.
Office Action, issued by the State Intellectual Property Office dated Jul. 13, 2022, in connection with Chinese Patent Application No. 201880063337.3.
Office Action, issued by the Japanese Patent Office Office dated Aug. 30, 2022, in connection with Japanese Patent Application No. 2019-545167.
Office Action, issued by the Japanese Patent Office Office dated Aug. 30, 2022, in connection with Japanese Patent Application No. 2019-545168.
Office Action, issued by the Japanese Patent Office Office dated Dec. 27, 2022, in connection with Japanese Patent Application No. 2019-545167.
Non-Final Office Action dated Sep. 6, 2022, in connection with U.S. Appl. No. 16/649,827.
Office Action, issued by the Japanese Patent Office Office dated Feb. 7, 2023, in connection with Japanese Patent Application No. 2019-545168.

* cited by examiner

REINFORCEMENT SHEET, REINFORCEMENT MEMBER, REINFORCEMENT KIT, PRODUCING METHOD OF REINFORCEMENT SHEET, AND PRODUCING METHOD OF REINFORCEMENT MEMBER

CROSS-REFERENCE TO RELATED APPLICATIONS

The present application is a 35 U.S.C. 371 National Stage Entry of PCT/JP2018/036423, filed on Sep. 28, 2018, which claims priority from Japanese Patent Application No. 2017-191287, filed on Sep. 29, 2017, the contents of all of which are herein incorporated by reference in their entirety.

TECHNICAL FIELD

The present invention relates to a reinforcement sheet, a reinforcement member, a reinforcement kit, a method for producing a reinforcement sheet, and a method for producing a reinforcement member.

BACKGROUND ART

It has been conventionally known that a metal plate used for various industrial products is reinforced by a reinforcement sheet.

As such a reinforcement sheet, for example, a steel plate reinforcement sheet including glass cloth and a thermosetting resin layer that is laminated on the glass cloth has been proposed (ref: for example, Patent Document 1).

In the reinforcement sheet, the thermosetting resin layer is attached to a steel plate, and thereafter, the thermosetting resin layer is cured by heating, so that the steel plate is reinforced.

CITATION LIST

Patent Document

Patent Document 1: Japanese Unexamined Patent Publication No. 2010-58394

SUMMARY OF THE INVENTION

Problem to be Solved by the Invention

Meanwhile, a reduction in thickness of the metal plate used for various industrial products has been recently required. In transportation machines such as automobiles, in particular, it has been required to achieve a reduction in thickness of the metal plate, and a weight reduction of the transportation machine in order to reduce an amount of emission of carbon dioxide.

However, when the metal plate achieves a reduction in thickness, the strength thereof may be insufficient. Then, it is considered that the metal plate is reinforced by using the steel plate reinforcement sheet described in Patent Document 1. In various industrial products such as transportation machines, further improvement of reinforcement properties of the steel plate reinforcement sheet described in Patent Document 1 with respect to the metal plate may be demanded.

The present invention provides a reinforcement sheet that is capable of achieving improvement of reinforcement properties with respect to a metal plate, a reinforcement member, a reinforcement kit, a method for producing a reinforcement sheet, and a method for producing a reinforcement member.

Means for Solving the Problem

The present invention [1] includes a reinforcement sheet for reinforcing a metal plate by adhering to the metal plate including a core material layer containing a resin and a filler, and a front layer disposed at one side in a thickness direction of the core material layer, wherein a content ratio of the filler in the core material layer is 15 mass % or more and below 85 mass %, and the front layer is obtained by laminating a plurality of unidirectional fiber resin composite sheets.

The present invention [2] includes the reinforcement sheet described in the above-described [1], wherein a Young's modulus of the core material layer is 600 MPa or more.

The present invention [3] includes the reinforcement sheet described in the above-described [1] or [2], wherein each of the plurality of unidirectional fiber resin composite sheets contains a carbon fiber or a glass fiber, and a thermosetting resin.

The present invention [4] includes the reinforcement sheet described in any one of the above-described [1] to [3], wherein a ratio of a thickness of the core material layer to a thickness of the front layer is 0.01 or more and 50 or less.

The present invention [5] includes the reinforcement sheet described in any one of the above-described [1] to [4] further including an adhesive layer disposed at the other side in the thickness direction of the core material layer.

The present invention [6] includes a reinforcement member including the reinforcement sheet described in any one of the above-described [1] to [5], and a metal plate reinforced by the reinforcement sheet.

The present invention [7] includes a reinforcement kit for reinforcing a metal plate by adhering to the metal plate including a core material layer containing a resin and a filler, and having a content ratio of the filler of 15 mass % or more and below 85 mass %; and a front layer obtained by laminating a plurality of unidirectional fiber resin composite sheets.

The present invention [8] includes a method for producing a reinforcement sheet for reinforcing a metal plate by adhering to the metal plate including the steps of preparing a core material layer containing a resin and a filler, and having a content ratio of the filler of 15 mass % or more and below 85 mass %; preparing a front layer obtained by laminating a plurality of unidirectional fiber resin composite sheets; and attaching the front layer to one side in a thickness direction of the core material layer.

The present invention [9] includes a method for producing a reinforcement member including the steps of preparing a reinforcement sheet including a core material layer containing a resin and a filler, and having a content ratio of the filler of 15 mass % or more and below 85 mass %, and a front layer disposed at one side in a thickness direction of the core material layer and obtained by laminating a plurality of unidirectional fiber resin composite sheets, and reinforcing a metal plate by attaching the reinforcement sheet to the metal plate.

The present invention [10] includes a method for producing a reinforcement member including the steps of attaching a core material layer containing a resin and a filler, and having a content ratio of the filler of 15 mass % or more and below 85 mass % to a metal plate, and reinforcing the metal plate by attaching a front layer obtained by laminating a plurality of unidirectional fiber resin composite sheets to a surface of the core material layer at the opposite side to the metal plate.

Effect of the Invention

The reinforcement sheet and the reinforcement kit of the present invention include the front layer obtained by laminating the plurality of unidirectional fiber resin composite sheets. Thus, compared to a case where the reinforcement sheet and the reinforcement kit include the front layer that consists of glass cloth, improvement of reinforcement properties of the reinforcement sheet and the reinforcement kit with respect to the metal plate can be achieved. As a result, the improvement of the strength of the metal plate (reinforcement member) reinforced by the reinforcement sheet or the reinforcement kit can be achieved.

The reinforcement member of the present invention includes the above-described reinforcement sheet and the metal plate reinforced by the reinforcement sheet. Thus, the improvement of the strength of the reinforcement member can be achieved.

The method for producing a reinforcement sheet of the present invention produces the above-described reinforcement sheet by attaching the front layer to the core material layer. Thus, the above-described reinforcement sheet can be smoothly produced by the easy method.

The method for producing a reinforcement member of the present invention produces the above-described reinforcement member by attaching the above-described reinforcement sheet to the metal plate or by attaching the front layer to the core material layer after attaching the core material layer to the metal plate. Thus, the above-described reinforcement member can be smoothly produced by the easy method.

DESCRIPTION OF EMBODIMENTS

First Embodiment

1. Reinforcement Sheet

A reinforcement sheet 1 that is a first embodiment of a reinforcement sheet of the present invention is described with reference to FIGS. 1A to 2.

Figure 1A:
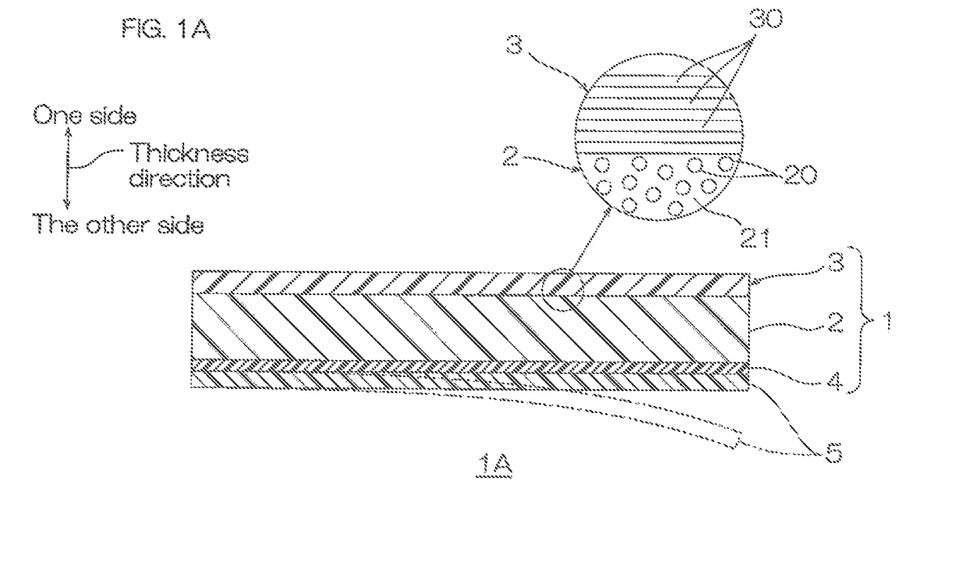
FIG. 1A shows a side cross-sectional view of a first embodiment of a reinforcement sheet of the present invention.

As shown in FIG. 1A, the reinforcement sheet 1 has a flat plate shape, and to be specific, has a predetermined thickness. The reinforcement sheet 1 extends in a predetermined direction perpendicular to a thickness direction, and has a flat front surface and a flat rear surface.

In FIG. 1A, the up-down direction on the plane of the sheet is the thickness direction of the reinforcement sheet 1. The upper side on the plane of the sheet is one side in the thickness direction, and the lower side on the plane of the sheet is the other side in the thickness direction.

In FIG. 1A, the right-left direction on the plane of the sheet is a first plane direction (direction perpendicular to the thickness direction) of the reinforcement sheet 1. The right side on the plane of the sheet is one side in the first plane direction, and the left side on the plane of the sheet is the other side in the first plane direction.

In FIG. 1A, the paper thickness direction is a second plane direction (direction perpendicular to both directions of the thickness direction and the first plane direction) of the reinforcement sheet 1. The near side on the plane of the sheet is one side in the second plane direction, and the far side on the plane of the sheet is the other side in the second plane direction.

The reinforcement sheet 1 is a member for reinforcing a metal plate 6 by adhering to the metal plate 6. The reinforcement sheet 1 includes a core material layer 2, a front layer 3 disposed at one side in the thickness direction of the core material layer 2, and an adhesive layer 4 disposed at the other side in the thickness direction of the core material layer 2. That is, the adhesive layer 4, the core material layer 2, and the front layer 3 are sequentially laminated from the other side toward one side in the thickness direction. Preferably, a release layer 5 is releasably attached to the adhesive layer 4. The reinforcement sheet 1 in which the release layer 5 is attached to the adhesive layer 4 is distinguished from the reinforcement sheet 1 without having the release layer 5 as a release layer-including reinforcement sheet 1A.

The core material layer 2 is disposed between the front layer 3 and the adhesive layer 4. The core material layer 2 has a thin layer shape, and to be specific, has a predetermined thickness. The core material layer 2 extends in the predetermined direction perpendicular to the thickness direction, and has a flat front surface (one-side surface in the thickness direction) and a flat rear surface (the other-side surface in the thickness direction). The core material layer 2 contains a resin and a filler. In the following, the resin contained in the core material layer 2 is referred to as a core material resin. FIG. 1A shows a schematic configuration diagram that enlarges a portion (portion surrounded by a circle) of the core material layer 2 and the front layer 3. In the schematic configuration diagram of the core material layer 2, the core material resin is represented as a core material resin 21, and a filler is represented as a filler 20.

Examples of the core material resin include polyolefin resin, polyamide resin, polyacetal resin, polycarbonate resin, polyphenylene ether resin, polybutylene terephthalate resin, polysulfide resin, polyphenylene sulfide resin, polyether ether ketone resin, polyimide resin, polyether imide resin, liquid crystal polymer, fluorine resin, epoxy resin, phenol resin, melamine resin, urea resin, unsaturated polyester, thermosetting polyimide resin, polyurethane resin, alkyd resin, and benzoxazine resin. Preferably, an epoxy resin is used. To be specific, examples of the epoxy resin include unmodified epoxy resin, rubber-modified epoxy resin, urethane-modified epoxy resin, and silicone-modified epoxy resin. These core material resins can be used alone or in combination of two or more. Of these core material resins, preferably, an unmodified epoxy resin and a rubber-modified epoxy resin are used.

The unmodified epoxy resin is an epoxy resin that is not modified by a modifier (for example, a rubber component (described later) or the like) having a functional group that reacts with an epoxy group. Examples of the unmodified epoxy resin include bisphenol epoxy resin (for example, bisphenol A epoxy resin, bisphenol F epoxy resin, bisphenol S epoxy resin, hydrogenated bisphenol A epoxy resin, or the like), novolak epoxy resin (for example, phenol novolak epoxy resin, cresol novolak epoxy resin, or the like), aromatic epoxy resin (for example, biphenyl epoxy resin, naphthalene epoxy resin, or the like), nitrogen-containing cyclic epoxy resin (for example, triglycidyl isocyanurate, hydantoin epoxy resin, or the like), alicyclic epoxy resin (for example, dicyclo ring-type epoxy resin or the like), glycidyl ether epoxy resin, and aliphatic epoxy resin. These unmodified epoxy resins can be used alone or in combination of two or more.

Of these unmodified epoxy resins, preferably, a bisphenol epoxy resin is used, more preferably, a bisphenol A epoxy resin is used.

The rubber-modified epoxy resin is an epoxy resin containing a rubber component, and is a reaction product of the epoxy resin with the rubber component.

As the epoxy resin used for the rubber-modified epoxy resin, for example, the above-described unmodified epoxy resin is used, preferably, a bisphenol epoxy resin is used, more preferably, a bisphenol A epoxy resin and a bisphenol F epoxy resin are used.

The rubber component has the functional group that reacts with the epoxy group. Examples of the rubber component include terminated carboxyl group butadiene-acrylonitrile copolymer (CTBN), butadiene rubber, acrylic rubber, and styrene-butadiene elastomer. These rubber components can be used alone or in combination of two or more.

Of these rubber components, preferably, a terminated carboxyl group butadiene-acrylonitrile copolymer (CTBN) is used. That is, as the rubber-modified epoxy resin, preferably, a CTBN-modified epoxy resin that is modified with a CTBN is used.

To prepare the rubber-modified epoxy resin, for example, the above-described unmodified epoxy resin is mixed with the above-described rubber component, and a catalyst is added thereto as needed to react (be modified) at, for example, 100 to 180° C. In this manner, the functional group and the epoxy group of the rubber component react, thereby preparing the rubber-modified epoxy resin.

The unmodified epoxy resin and the rubber-modified epoxy resin are preferably used in combination. More preferably, the core material resin consists of the unmodified epoxy resin and the rubber-modified epoxy resin. When the unmodified epoxy resin and the rubber-modified epoxy resin are used in combination, improvement of compatibility and adhesive properties of the core material resin can be achieved compared to a case where the unmodified epoxy resin is mixed with a synthetic rubber (for example, polybutene rubber or the like).

When the unmodified epoxy resin and the rubber-modified epoxy resin are used in combination, a mass ratio (rubber-modified epoxy resin:unmodified epoxy resin) of the rubber-modified epoxy resin to the unmodified epoxy resin is, for example, 0.1:99.9 to 99.9:0.1, preferably 1:99 to 99:1, more preferably 10:90 to 90:10, further more preferably 60:40 to 40:60.

When the core material resin is a thermosetting resin, the core material resin is desirably in an uncured state.

The filler is a hard filler, and is, for example, uniformly dispersed in the core material layer 2. Examples of the filler include calcium carbonate (for example, heavy calcium carbonate, light calcium carbonate, Hakuenka, or the like), calcium oxide, talc, mica, clay, mica powder, bentonite, silica (for example, hydrophobic silica or the like), alumina, aluminum silicate, aluminum hydroxide, titanium oxide, barium titanate, ferrite, carbon black, acetylene black, aluminum powder, glass powder, glass balloon, and chopped strands (for example, glass fiber, carbon fiber, aramid fiber, or the like). These fillers can be used alone or in combination of two or more.

Of these fillers, preferably, calcium carbonate is used, more preferably, heavy calcium carbonate is used.

A content ratio of the filler in the core material layer 2 is, for example, 15 mass % or more, preferably 30 mass % or more, more preferably 40 mass % or more, further more preferably 50 mass % or more, particularly preferably 60 mass % or more, more particularly preferably 70 mass % or more, and for example, below 85 mass %, preferably 83 mass % or less, more preferably 82 mass % or less, further more preferably 80 mass % or less, particularly preferably 78 mass % or less, more particularly preferably 75 mass % or less.

When the content ratio of the filler in the core material layer 2 is the above-described lower limit or more, a Young's modulus of the core material layer 2 can be adjusted within a preferable range (described later), so that the improvement of the maximum bending testing force of a reinforcement member 10 (described later), and particularly, the improvement of the maximum bending testing force of the reinforcement member 10 (described later) at a high temperature region (for example, 80° C. or more) can be achieved. When the content ratio of the filler in the core material layer 2 is below the above-described upper limit, the filler can be uniformly dispersed in the core material layer 2, and the core material layer 2 can be surely formed.

The core material layer 2 preferably further contains a latent curing agent as an optional component.

The latent curing agent is solid at room temperature (23° C.), and cures the core material resin at a predetermined temperature. The latent curing agent has, for example, activity at 80° C. or more and 200° C. or less.

Examples of the latent curing agent include urea compound, amine compound, acid anhydride compound, amide compound, cyano compound, dihydrazide compound, imidazole compound, and imidazoline compound.

Examples of the urea compound include 3-(3,4-dichlorophenyl)-1,1-dimethylurea (DCMU), N'-phenyl-N,N-dimethylurea, and 1,1'-(methyl-m-phenylene) bis(3,3'-dimethylurea).

Examples of the amine compound include ethylenediamine, propylenediamine, diethylenetriamine, triethylenetetramine, and amine adduct thereof, methaphenylenediamine, diaminodiphenyl methane, and diaminodiphenyl sulfone.

Examples of the acid anhydride compound include phthalic anhydride, maleic anhydride, tetrahydrophthalic anhydride, dodecenyl succinic anhydride, dichloro succinic anhydride, benzophenone tetracarboxylic anhydride, and chlorendic anhydride.

An example of the amide compound includes polyamide.

An example of the cyano compound includes dicyandiamide.

An example of the hydrazide compound includes dihydrazide such as adipic acid dihydrazide.

Examples of the imidazole compound include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline compound include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

These latent curing agents can be used alone or in combination of two or more.

Of these latent curing agents, preferably, a urea compound and a cyano compound are used, more preferably, a urea compound and a cyano compound are used in combination, further more preferably, DCMU and dicyandiamide are used in combination.

The content ratio of the latent curing agent with respect to 100 parts by mass of the core material resin is, for example, 0.5 parts by mass or more, preferably 1 part by mass or more, and for example, 30 parts by mass or less, preferably 20 parts by mass or less, more preferably 15 parts by mass or less.

Furthermore, in addition to the above-described components, as an optional component, for example, a known additive can be also added to the core material layer 2 at an appropriate ratio. Examples of the known additive include toughness imparting agent (for example, thermoplastic resins such as rubber, elastomer, urethane, and polyamide; core-shell-type acrylic polymer rubber particles, or the like), tackifier (for example, rosin resin, terpene resin, coumarone-indene resin, petroleum resin, or the like), lubricant (for example, stearic acid or the like), stabilizer, antiaging inhibitor, oxidation inhibitor, ultraviolet absorber, colorant, flame retardant, antistatic agent, conductivity imparting agent, sliding property imparting agent, and surfactant.

When the core material resin is in a cured state, the Young's modulus of the core material layer 2 is, for example, 600 MPa or more, preferably 1000 MPa or more, more preferably 2000 MPa or more, and for example, 7000 MPa or less. The Young's modulus can be calculated by the following formula (1) by using the result measured by the following tensile test (hereinafter, the same).

Tensile test: a sample (the core material layer) is cut out into a size of a width of 10 mm×a length of 100 mm. Then, the minimum thickness of the central portion of the sample is measured. Next, the sample is measured under the following test conditions.

Test conditions: distance between holder of 50 mm, tensile rate of 1 mm/min, room temperature of 23° C.

$$E = \frac{\Delta F}{S} \times \frac{L}{\Delta L} \quad (1)$$

$\Delta F$: increase in load (0.1→0.4 mm displacement), S: cross-sectional area (thickness×width), L: initial length (50 mm), $\Delta L$: increased amount of length When the Young's modulus of the core material layer 2 is the above-described lower limit or more, the improvement of reinforcement properties of the reinforcement sheet 1 with respect to the metal plate 6 can be surely achieved, and the improvement of the maximum bending testing force of the reinforcement member 10 (described later) can be surely achieved. Thus, a reduction in thickness of the core material layer 2 can be achieved, and to be specific, when a thickness of the core material layer 2 is set within the following range, the maximum bending testing force of the reinforcement member 10 (described later) can be sufficiently ensured.

The core material layer 2 has a thickness of, for example, 0.1 mm or more, preferably 1 mm or more, and for example, 20 mm or less, preferably 10 mm or less, more preferably 2 mm or less.

A ratio of the thickness of the core material layer 2 with respect to that of the front layer 3 is, for example, 0.01 or more, preferably 0.1 or more, more preferably 0.2 or more, further more preferably 1 or more, and for example, 50 or less, preferably 40 or less, more preferably 30 or less, further more preferably 10 or less, particularly preferably 5 or less.

When the ratio of the thickness of the core material layer 2 with respect to that of the front layer 3 is the above-described lower limit or more, the number (number of lamination) of a unidirectional fiber resin composite sheet 30 (described later) in the front layer 3 can be reduced, and a reduction in production cost of the front layer 3 can be achieved. When the ratio of the thickness of the core material layer 2 with respect to that of the front layer 3 is the above-described upper limit or less, the thickness of the front layer 3 can be sufficiently ensured, and the improvement of the reinforcement properties of the reinforcement sheet 1 with respect to the metal plate 6 can be more surely achieved. Thus, the improvement of the maximum bending testing force of the reinforcement member 10 (described later) can be more surely achieved.

The front layer 3 is disposed on the front surface (one-side surface in the thickness direction) of the core material layer 2. The front layer 3 has a thin layer shape, and to be specific, has a predetermined thickness. The front layer 3 extends in the predetermined direction perpendicular to the thickness direction, and has a flat front surface and a flat rear surface. In FIG. 1A, a size of the front layer 3 is the same as that of the core material layer 2, and the size of the front layer 3 is not limited to this. The front layer 3 may be smaller than the core material layer 2 in the plane direction of the reinforcement sheet 1.

The front layer 3 is obtained by laminating the plurality of unidirectional fiber resin composite sheets 30 (ref: schematic configuration diagram of FIG. 1A). The front layer 3 preferably consists of the plurality of unidirectional fiber resin composite sheets 30.

Each of the plurality of unidirectional fiber resin composite sheets 30 contains a plurality of fibers and a resin. Each of the plurality of unidirectional fiber resin composite sheets 30 is formed by subjecting the resin to impregnation treatment of a fiber substrate consisting of the plurality of fibers. In the following, the resin contained in the unidirectional fiber resin composite sheet 30 is referred to as a front layer resin.

Figure 2:
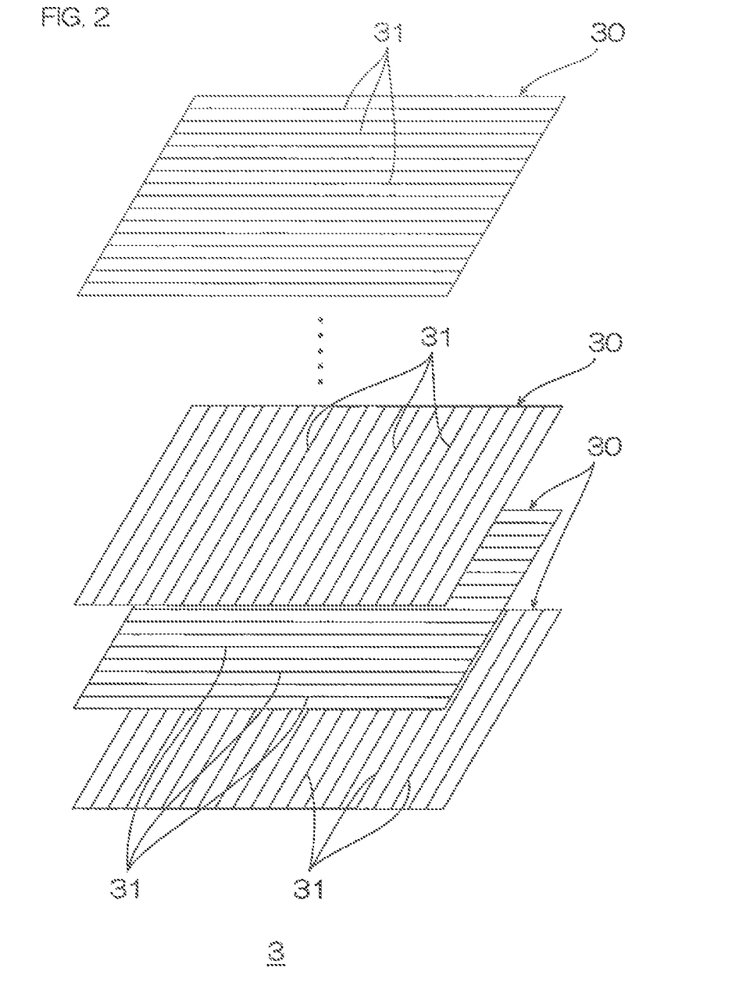
FIG. 2 shows a disassembled perspective view of a front layer shown in FIG. 1A.

As shown in FIG. 2, each of a plurality of fibers 31 extends in the same direction perpendicular to the thickness direction (hereinafter, referred to as a fiber direction) in each of the plurality of unidirectional fiber resin composite sheets 30. The plurality of fibers 31 are arranged in the direction perpendicular to the fiber direction so as to be generally parallel with each other in each of the unidirectional fiber resin composite sheets 30.

Examples of the fiber include carbon fiber and glass fiber. In each of the unidirectional fiber resin composite sheets 30, these fibers can be used alone or in combination of two or more, and the fiber is preferably used alone. That is, each of the plurality of unidirectional fiber resin composite sheets 30 preferably contains the carbon fiber or the glass fiber. The entire plurality of unidirectional fiber resin composite sheets 30 preferably contain the same kind of fiber.

Of these fibers, preferably, a carbon fiber is used. When the plurality of fibers contain the carbon fiber, the improvement of the reinforcement properties of the reinforcement sheet 1 with respect to the metal plate 6 can be further more surly achieved.

The mass (basis weight) per unit area of the plurality of fibers in each of the unidirectional fiber resin composite sheets 30 is, for example, 10 $g/m^2$ or more, preferably 80 $g/m^2$ or more, and for example, 500 $g/m^2$ or less, preferably 200 $g/m^2$ or less.

The front layer resin is impregnated in the plurality of fibers 31. The front layer resin is not particularly limited, and an example thereof includes the thermosetting resin. To be specific, examples of the thermosetting resin include epoxy resin, urethane resin, melamine resin, and phenol resin. In each of the unidirectional fiber resin composite sheets 30, these front layer resins can be used alone or in combination of two or more, and the front layer resin is preferably used alone. The entire plurality of unidirectional fiber resin composite sheets 30 preferably contain the same kind of front layer resin.

Of these front layer resins, preferably, an epoxy resin is used. As the epoxy resin used for the front layer resin, for example, the same epoxy resin as that used for the core material resin is used. These epoxy resins can be used alone or in combination of two or more.

When the front layer resin is the thermosetting resin, the front layer resin is desirably in an uncured state.

The content ratio (resin content ratio) of the front layer resin in each of the unidirectional fiber resin composite sheets 30 is, for example, 10 mass % or more, preferably 20 mass % or more, and for example, 60 mass % or less, preferably 40 mass % or less.

Each of the unidirectional fiber resin composite sheets 30 preferably contains the above-described latent curing agent at an appropriate ratio as an optional component.

When the fiber direction is in a state of being orientated in a tensile direction, and the front layer resin is in a cured state, a tensile strength per one layer of the plurality of unidirectional fiber resin composite sheets 30 is, for example, 100 MPa or more, preferably 300 MPa or more, and for example, 7000 MPa or less. The tensile strength can be calculated by measuring the maximum testing force (the maximum value of a load in a tensile test) of a sample (the unidirectional fiber resin composite sheet 30), and dividing the obtained maximum testing force by the cross-sectional area (thickness×width) of the sample in conformity with the above-described tensile test (hereinafter, the same).

When the tensile strength of each of the unidirectional fiber resin composite sheets 30 is the above-described lower limit or more, the improvement of the reinforcement properties of the reinforcement sheet 1 with respect to the metal plate 6 can be further more surely achieved, and the improvement of the maximum bending testing force of the reinforcement member 10 (described later) can be further more surely achieved.

Each of the unidirectional fiber resin composite sheets 30 has a thickness of, for example, 0.01 mm or more, preferably 0.05 mm or more, and for example, 0.5 mm or less, preferably 0.3 mm or less.

A commercially available product can be used as the unidirectional fiber resin composite sheet 30. Examples of the commercially available product of the unidirectional fiber resin composite sheet 30 include trade name: P3252S-10 (basis weight of 100 $g/m^2$, resin content ratio of 33 mass %, manufactured by TORAY INDUSTRIES INC.), trade name: P3255-25 (basis weight of 250 $g/m^2$, resin content ratio of 24 mass %, manufactured by TORAY INDUSTRIES INC.), trade name: P17045G-12 (basis weight of 125 $g/m^2$, resin content ratio of 24 mass %, manufactured by TORAY INDUSTRIES INC.), trade name: TR395G100S (basis weight of 100 $g/m^2$, resin content ratio of 33 mass %, manufactured by Mitsubishi Chemical Corporation), trade name: TR380G250S (basis weight of 250 $g/m^2$, resin content ratio of 33 mass %, manufactured by Mitsubishi Chemical Corporation), and trade name: TRH350C125S (basis weight of 125 $g/m^2$, resin content ratio of 25 mass %, manufactured by Mitsubishi Chemical Corporation).

The plurality of unidirectional fiber resin composite sheets 30 are laminated in the thickness direction of the reinforcement sheet 1, and laminated so that the fiber directions of the unidirectional fiber resin composite sheets 30 that are next to each other cross (for example, are perpendicular to) each other.

The number (number of lamination) of the plurality of unidirectional fiber resin composite sheets 30 is, for example, two or more, preferably three or more, and for example, below 10.

When the number (number of lamination) of the plurality of unidirectional fiber resin composite sheets 30 is the above-described lower limit or more, the reinforcement properties of the reinforcement sheet 1 with respect to the metal plate 6 can be ensured. When the number (number of lamination) of the plurality of unidirectional fiber resin composite sheets 30 is the above-described upper limit or less, the number of lamination of the plurality of unidirectional fiber resin composite sheets 30 can be reduced, and a reduction in the production cost of the front layer 3 can be achieved.

The front layer 3 has a thickness of, for example, 0.02 mm or more, preferably 0.15 mm or more, and for example, 5 mm or less, preferably 1 mm or less, more preferably 0.5 mm or less.

As shown in FIG. 1A, the adhesive layer 4 is disposed on the rear surface (the other-side surface in the thickness direction) of the core material layer 2. The adhesive layer 4 has a thin layer shape, and to be specific, has a predetermined thickness. The adhesive layer 4 extends in the predetermined direction perpendicular to the thickness direction, and has a flat front surface and a flat rear surface. The adhesive layer 4 is, for example, formed from a known adhesive or a known double-coated adhesive tape.

An adhesive that forms the adhesive layer 4 is in a paste state, and examples thereof include epoxy adhesive, urethane adhesive, and acrylic adhesive. These adhesives can be used alone or in combination of two or more.

The double-coated adhesive tape that forms the adhesive layer 4 includes, for example, a substrate, and the above-described adhesive that is laminated on both surfaces of the substrate. An example of the double-coated adhesive tape that forms the adhesive layer 4 includes a thermosetting double-coated tape NA590 manufactured by NITTO DENKO CORPORATION. The adhesive layer 4 is preferably formed from a double-coated adhesive tape.

The adhesive layer 4 has a thickness of, for example, 0.05 mm or more, preferably 0.1 mm or more, and for example, 1 mm or less, preferably 0.5 mm or less.

The release layer 5 is positioned at the opposite side of the adhesive layer 4 with respect to the core material layer 2. The release layer 5 is releasably attached to the front surface of the adhesive layer 4 so as to protect the adhesive layer 4 until the reinforcement sheet 1 is used for forming the reinforcement member 10 (described later). That is, the release layer 5 is a layer that is laminated on the front surface of the adhesive layer 4 so as to cover the front surface of the adhesive layer 4 at the time of shipping, conveyance, and storage of the reinforcement sheet 1, and has flexibility that can be peeled from the front surface of the adhesive layer 4 so as to curve in a generally U-shape immediately before the use of the reinforcement sheet 1.

The attached surface of the release layer 5 is subjected to release treatment as needed. Examples of a material for the release layer 5 include resin materials such as polyester (for example, polyethylene terephthalate (PET) or the like), polyolefin (for example, polyethylene, polypropylene, or the like), and fluorine resin (for example, polytetrafluoroethylene (PTFE) or the like) and resin coat paper. Preferably, polyethylene terephthalate is used.

The release layer 5 may not be attached to the adhesive layer 4. In this case, the adhesive layer 4 of the reinforcement sheet 1 is exposed.

2. Producing Method of Reinforcement Sheet

Next, a method for producing the reinforcement sheet 1 as the first embodiment of a method for producing a reinforcement sheet of the present invention is described.

The method for producing the reinforcement sheet 1 includes the steps of preparing the core material layer 2, preparing the front layer 3, attaching the front layer 3 to one side in the thickness direction of the core material layer 2, and forming the adhesive layer 4 at the other side in the thickness direction of the core material layer 2.

In the step of preparing the core material layer 2, in the case of the thermosetting resin, first, the above-described core material resin in an uncured state, the above-described filler, and if necessary, the above-described optional component (latent curing agent and additive) are kneaded so as to have the above-described content ratio, thereby preparing a resin composition (kneaded product).

In the case of the thermosetting resin, as the core material resin in an uncured state, preferably, the above-described unmodified epoxy resin and the above-described rubber-modified epoxy resin are used.

A state of the unmodified epoxy resin at room temperature (23° C.) is not particularly limited, and for example, any one of solid, semi-solid, and liquid may be used.

An epoxy equivalent of the unmodified epoxy resin is, for example, 80 g/eq. or more, preferably 100 g/eq. or more, and for example, 1000 g/eq. or less, preferably 800 g/eq. or less, more preferably 600 g/eq. or less, further more preferably 300 g/eq. or less. The epoxy equivalent can be measured in conformity with JIS K7236: 2001 (hereinafter, the same).

A commercially available product can be used as the unmodified epoxy resin. Examples of the commercially available product of the unmodified epoxy resin include trade name: JER 828 (epoxy equivalent of 184 g/eq. to 194 g/eq., manufactured by Mitsubishi Chemical Corporation), trade name: JER 834 (epoxy equivalent of 230 g/eq. to 270 g/eq., manufactured by Mitsubishi Chemical Corporation), trade name: JER 1001 (epoxy equivalent of 450 g/eq. to 500 g/eq., manufactured by Mitsubishi Chemical Corporation), trade name: YD-115 (epoxy equivalent of 180 g/eq. to 194 g/eq., manufactured by New Nippon Steel Chemical Co., Ltd.), trade name: YD-134 (epoxy equivalent of 220 g/eq. to 270 g/eq., manufactured by New Nippon Steel Chemical Co., Ltd.), trade name: YD-011 (epoxy equivalent of 440 g/eq. to 510 g/eq., manufactured by New Nippon Steel Chemical Co., Ltd.), and trade name: EP-4100HF (epoxy equivalent of 182 g/eq., manufactured by ADEKA CORPORATION). These can be used alone or in combination of two or more.

A state of the rubber-modified epoxy resin at room temperature (23° C.) is not particularly limited, and for example, any one of solid, semi-solid, and liquid may be used.

The epoxy equivalent of the rubber-modified epoxy resin is, for example, 80 g/eq. or more, preferably 200 g/eq. or more, and for example, 10000 g/eq. or less, preferably 2000 g/eq. or less.

A commercially available product can be used as the rubber-modified epoxy resin. Examples of the commercially available product of the rubber-modified epoxy resin include trade name: EPR1415-1 (liquid CTBN-modified epoxy resin, epoxy equivalent of 400 g/eq., manufactured by ADEKA CORPORATION), trade name: EPR2000 (liquid CTBN-modified epoxy resin, epoxy equivalent of 215 g/eq., manufactured by ADEKA CORPORATION), trade name: HypoxRK84L (solid CTBN-modified epoxy resin, epoxy equivalent of 1200 to 1800 g/eq., manufactured by CVC Specialty Chemicals Inc.), and trade name: HypoxRA840 (liquid CTBN-modified epoxy resin, epoxy equivalent of 350 g/eq., manufactured by CVC Specialty Chemicals Inc.). These can be used alone or in combination of two or more.

In kneading of each of the components (core material resin, filler, and optional component), the filler imparts thixotropy to the resin composition, and functions as a viscosity modifier.

A kneading method of each of the components is not particularly limited, and an example thereof includes kneading with a mixing roll.

In the kneading of each of the components, each of the components can be also heated at a temperature below the temperature at which the latent curing agent substantially reacts as needed. A heating temperature in the kneading is below the temperature at which the latent curing agent substantially reacts, and is, for example, below 150° C., and for example, room temperature (23° C.) or more.

Next, the resin composition is sandwiched between two release paper to be rolled by, for example, press molding or the like.

In this manner, the core material layer 2 is prepared between the two release paper.

Also, the core material layer 2 is heated as needed, so that the core material resin can be cured. The heating temperature for curing the core material resin is a temperature at which the latent curing agent substantially reacts or more, and is, for example, 80° C. or more, preferably 150° C. or more, and for example, 250° C. or less.

In the step of preparing the front layer 3, first, the plurality of unidirectional fiber resin composite sheets 30 are prepared.

The plurality of unidirectional fiber resin composite sheets 30 are laminated in the thickness direction so that the fiber directions of the unidirectional fiber resin composite sheets 30 that are next to each other cross (for example, are perpendicular to) each other.

Thereafter, the laminated plurality of unidirectional fiber resin composite sheets 30 are pressed so as to be sandwiched from the outside in the thickness direction.

In this manner, the front layer 3 is prepared.

Next, in the step of attaching the front layer 3 to the core material layer 2, first, the two release paper is peeled from the core material layer 2. Then, the front layer 3 is disposed on the front surface (one-side surface in the thickness direction) of the core material layer 2 to be pressed so that the front layer 3 goes toward the core material layer 2 as needed.

In this manner, the front layer 3 is attached to the core material layer 2.

Next, in the step of forming the adhesive layer 4 on the core material layer 2, when the adhesive layer 4 is formed from an adhesive, the adhesive is applied to the rear surface (the other-side surface in the thickness direction) of the core material layer 2 by a known method. When the adhesive layer 4 is formed from a double-coated adhesive tape, the double-coated adhesive tape is attached to the rear surface (the other-side surface in the thickness direction) of the core material layer 2.

In this manner, the adhesive layer 4 is formed on the rear surface (the other-side surface in the thickness direction) of the core material layer 2.

In this way, the reinforcement sheet 1 including the core material layer 2, the front layer 3 that is disposed on the front surface (one side in the thickness direction) of the core material layer 2, and the adhesive layer 4 that is disposed on the rear surface (the other side in the thickness direction) of the core material layer 2 is produced (prepared).

Thereafter, the release layer 5 is attached to the adhesive layer 4 as needed. In this manner, the release layer-including reinforcement sheet 1A is produced.

3. Reinforcement of Metal Plate by Reinforcement Sheet (Producing Method of Reinforcement Member)

Figure 1B:
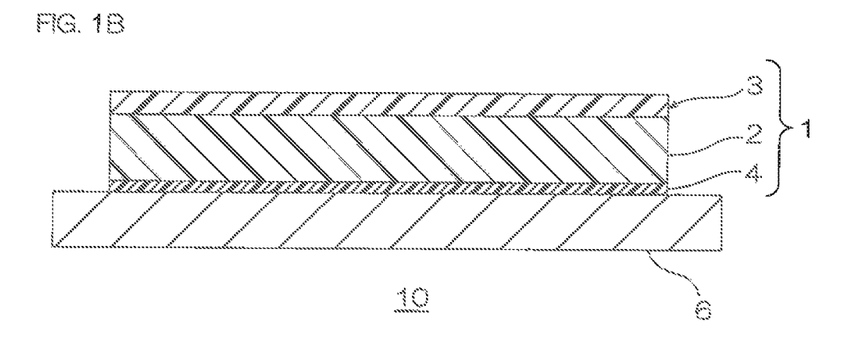
FIG. 1B shows an explanatory view for illustrating a one embodiment of a method for producing a reinforcement member of the present invention, and shows a step of attaching the reinforcement sheet shown in FIG. 1A to a metal plate.

As shown in FIG. 1B, the reinforcement sheet 1 reinforces the metal plate 6 by adhering to the metal plate 6.

The metal plate 6 is a metal plate used for various industrial products, and is not particularly limited. Examples of the metal plate 6 include metal plates used for transportation machines (for example, pillar, roof, fender, hood, trunk, quarter panel, door, door handle, door mirror of automobiles, or the like), and metal plates used for household electric appliances. Preferably, a metal plate used for a transportation machine is used.

In FIG. 1B, the metal plate 6 has a flat plate shape for convenience. However, the shape of the metal plate 6 is not particularly limited. Examples of the shape thereof include flat plate shape and tubular shape (for example, cylindrical shape, rectangular cylindrical shape, or the like).

To reinforce the metal plate 6 by the reinforcement sheet 1, after the release layer 5 is peeled from the adhesive layer 4 as needed, the exposed adhesive layer 4 is attached to the front surface of the metal plate 6. In this manner, the reinforcement sheet 1 is disposed on the metal plate 6.

Figure 1C:
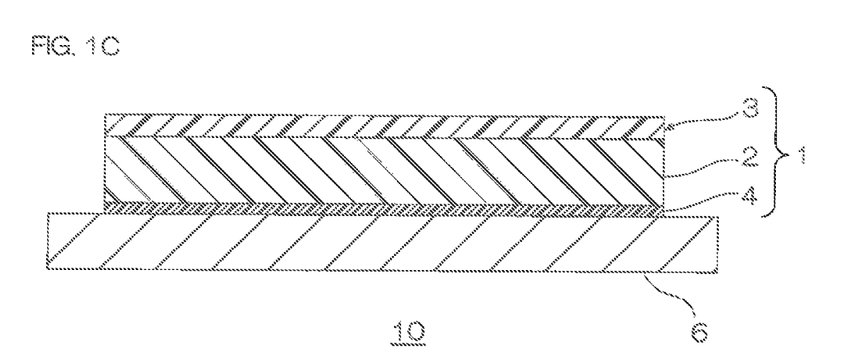
FIG. 1C, subsequent to FIG. 1B, shows a step of curing an adhesive layer and if necessary, a core material resin and a front layer resin.

Next, as shown in FIG. 1C, the metal plate 6 on which the reinforcement sheet 1 is disposed is heated, and the adhesive layer 4 is cured. When each of the core material resin of the core material layer 2 and the front layer resin of the front layer 3 is in an uncured state before heating, they are cured (brought into a cured state) at the time of heating.

The heating temperature is a temperature at which the latent curing agent substantially reacts or more, and is, for example, 80° C. or more, preferably 150° C. or more, and for example, 250° C. or less.

The heating time is, for example, 5 minutes or more, preferably 10 minutes or more, and for example, 80 minutes or less, preferably 60 minutes or less.

In this way, the reinforcement sheet 1 reinforces the metal plate 6 by adhering to the metal plate 6. Also, the reinforcement member 10 including the reinforcement sheet 1, and the metal plate 6 that is reinforced by the reinforcement sheet 1 is produced.

The maximum bending testing force at room temperature (23° C.) of the reinforcement member 10 is, for example, 400 N or more, preferably 500 N or more, more preferably 600 N or more. The maximum bending testing force can be measured in conformity with the method described in Examples (hereinafter, the same).

The maximum bending testing force at 100° C. of the reinforcement member 10 is, for example, 150 N or more, preferably 200 N or more, more preferably 400 N or more.

Figure 3A:
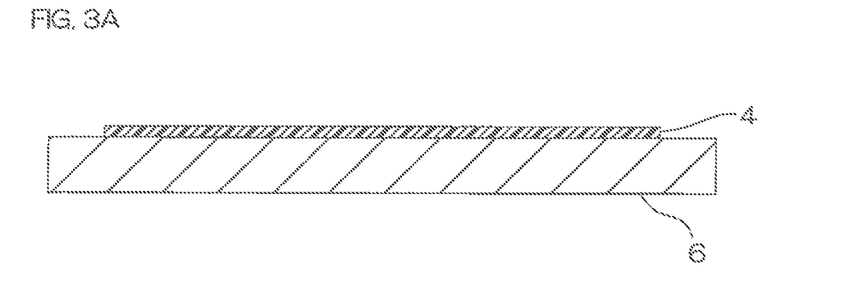
FIG. 3A shows an explanatory view for illustrating another embodiment of a method for producing a reinforcement member of the present invention, and shows a step of forming an adhesive layer on a metal plate.
Figure 3B:
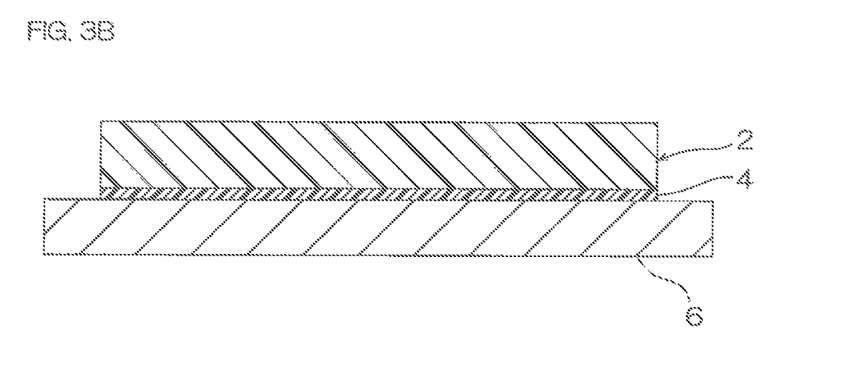
FIG. 3B, subsequent to FIG. 3A, shows a step of attaching a core material layer to the adhesive layer.
Figure 3C:
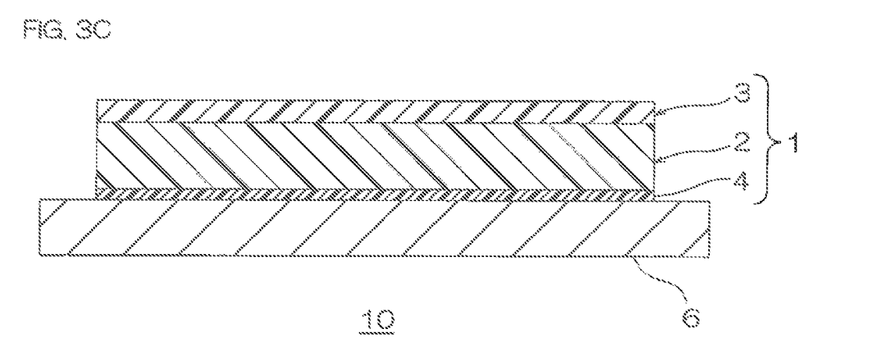
FIG. 3C, subsequent to FIG. 3B, shows a step of attaching a front layer to the core material layer.

As shown in FIGS. 3A to 3C, the reinforcement member 10 can be also produced by sequentially laminating the adhesive layer 4, the core material layer 2, and the front layer 3 on the metal plate 6.

To be specific, as shown in FIG. 3A, first, the adhesive layer 4 is formed on the metal plate 6.

Next, as shown in FIG. 3B, the core material layer 2 is disposed on the surface of the adhesive layer 4 at the opposite side to the metal plate 6 to be pressed so that the core material layer 2 goes toward the adhesive layer 4 as needed. In this manner, the core material layer 2 is attached to the surface of the adhesive layer 4 at the opposite side to the metal plate 6. In other words, the core material layer 2 is attached to the metal plate 6 by the adhesive layer 4.

Next, as shown in FIG. 3C, the front layer 3 is disposed on the surface of the core material layer 2 at the opposite side to the metal plate 6 to be pressed so that the front layer 3 goes toward the core material layer 2 as needed. In this manner, the front layer 3 is attached to the surface of the core material layer 2 at the opposite side to the metal plate 6.

In this way, the reinforcement sheet 1 including the adhesive layer 4, the core material layer 2, and the front layer 3 is disposed on the metal plate 6.

Thereafter, as shown in FIG. 1C, the metal plate 6 on which the reinforcement sheet 1 is disposed is heated in the same manner as the description above, and the adhesive layer 4, and if necessary, the core material resin and the front layer resin are cured.

In this manner, the reinforcement sheet 1 reinforces the metal plate 6 by adhering to the metal plate 6. Also, the reinforcement member 10 is produced.

As shown in FIG. 1A, the reinforcement sheet 1 includes the core material layer 2 having the content ratio of the filler 20 within the above-described range, and the front layer 3 obtained by laminating the plurality of unidirectional fiber resin composite sheets 30. When a load is applied from the outside to the reinforcement member 10, the front layer 3 is disposed on the front surface of the core material layer 2 to which the largest tensile stress is applied.

Thus, compared to a case where the front layer 3 is formed from glass cloth, the improvement of the reinforcement properties of the reinforcement sheet 1 with respect to the metal plate 6 can be achieved, and the improvement of the strength (to be specific, the maximum bending testing force or the like) of the reinforcement member 10 can be achieved.

The content ratio of the filler 20 in the core material layer 2 is the above-described lower limit or more, so that the Young's modulus of the core material layer 2 can be adjusted in a preferable range, and thus, the improvement of the strength of the reinforcement member 10, and particularly, the improvement of the strength of the reinforcement member 10 at a high temperature region (for example, 80° C. or more) can be achieved. The content ratio of the filler 20 in the core material layer 2 is below the above-described upper limit, so that the filler can be uniformly dispersed in the core material layer 2, and the core material layer 2 can be surely formed.

When the number (number of lamination) of the plurality of unidirectional fiber resin composite sheets 30 is increased in the reinforcement sheet 1, and the reinforcement sheet 1 consists of the plurality of unidirectional fiber resin composite sheets 30, the reinforcement properties of the reinforcement sheet 1 with respect to the metal plate 6 can be sufficiently ensured. However, there is a disadvantage that when the number (number of lamination) of the plurality of unidirectional fiber resin composite sheets 30 is increased, the number of steps of laminating those is increased, the production (preparation) step of the front layer 3 is complicated, and accordingly, the production cost of the reinforcement sheet 1 is increased.

Meanwhile, the reinforcement sheet 1 includes the core material layer 2, so that the reinforcement properties of the reinforcement sheet 1 with respect to the metal plate 6 can be sufficiently ensured, while a reduction in the number (number of lamination) of the plurality of unidirectional fiber resin composite sheets 30 included in the front layer 3 can be achieved. Thus, compared to a case where the reinforcement sheet 1 consists of the plurality of unidirectional fiber resin composite sheets 30 without including the core material layer 2, the improvement of the strength of the reinforcement member 10 can be achieved, while a reduction in the production cost can be achieved.

The Young's modulus of the core material layer 2 is the above-described lower limit or more. Thus, the improvement of the reinforcement properties of the reinforcement sheet 1 with respect to the metal plate 6 can be surely achieved, and the improvement of the strength of the reinforcement member 10 can be surely achieved.

Each of the unidirectional fiber resin composite sheets 30 contains the carbon fiber or the glass fiber, and the thermosetting resin. Thus, the improvement of the reinforcement properties of the reinforcement sheet 1 with respect to the metal plate 6 can be more surely achieved, and the improvement of the strength of the reinforcement member 10 can be further more surely achieved.

The ratio of the thickness of the core material layer 2 with respect to that of the front layer 3 is the above-described lower limit or more. Thus, a reduction in the number (number of lamination) of the plurality of unidirectional fiber resin composite sheets 30 in the front layer 3 can be achieved, and a reduction in the production cost of the reinforcement sheet 1 can be achieved. Also, the ratio of the thickness of the core material layer 2 with respect to that of the front layer 3 is the above-described upper limit or less. Thus, the thickness of the front layer 3 can be sufficiently ensured, and the reinforcement properties of the reinforcement sheet 1 with respect to the metal plate 6 can be sufficiently ensured.

The reinforcement sheet 1 further includes the adhesive layer 4 that is disposed at the other side in the thickness direction of the core material layer 2. Thus, even when the content ratio of the filler in the core material layer 2 is the above-described lower limit or more, the reinforcement sheet 1 can surely adhere to the metal plate 6.

As shown in FIG. 1C, the reinforcement member 10 includes the reinforcement sheet 1, and the metal plate 6 that is reinforced by the reinforcement sheet 1. Thus, the improvement of the strength of the reinforcement member 10 can be achieved.

As shown in FIG. 1A, the reinforcement sheet 1 can be produced by the easy method of attaching the front layer 3 to the core material layer 2. Thus, the reinforcement sheet 1 can be smoothly produced.

The reinforcement member 10 is produced by the easy method of attaching the reinforcement sheet 1 to the metal plate 6 as shown in FIG. 1C, or attaching the front layer 3 to the core material layer 2 after attaching the core material layer 2 to the metal plate 6. Thus, the reinforcement member 10 can be smoothly produced.

Second Embodiment

Figure 4A:
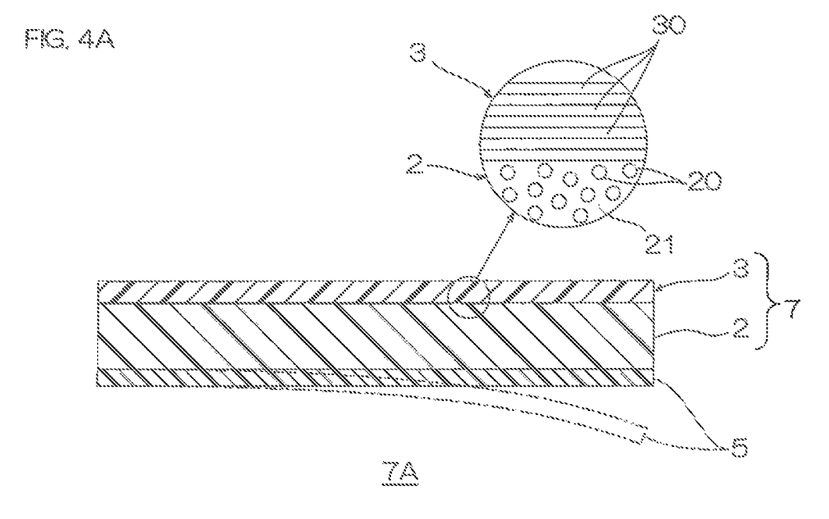
FIG. 4A shows a side cross-sectional view of a second embodiment of a reinforcement sheet of the present invention.

Next, a reinforcement sheet 7 as a second embodiment of a reinforcement sheet of the present invention is described with reference to FIGS. 4A and 4B. The same reference numerals are provided for members and steps corresponding to each of those in the above-described first embodiment, and their detailed description is omitted.

As shown in FIG. 1A, the reinforcement sheet 1 includes the adhesive layer 4. However, the reinforcement sheet of the present invention may not include an adhesive layer. The reinforcement sheet 7 does not include the adhesive layer 4, and includes the core material layer 2 and the front layer 3. The reinforcement sheet 7 preferably consists of the core material layer 2 and the front layer 3. In the reinforcement sheet 7, in the case of the thermosetting resin, the core material resin of the core material layer 2 is in an uncured state, and the core material layer 2 preferably has surface tackiness.

The release layer 5 is releasably attached to the surface of the core material layer 2 at the opposite side to the front layer 3. The reinforcement sheet 7 in which the release layer 5 is attached to the core material layer 2 is distinguished from the reinforcement sheet 7 without having the release layer 5 as a release layer-including reinforcement sheet 7A. The release layer 5 may not be attached to the core material layer 2. In this case, the other-side surface in the thickness direction of the core material layer 2 is exposed.

Figure 4B:
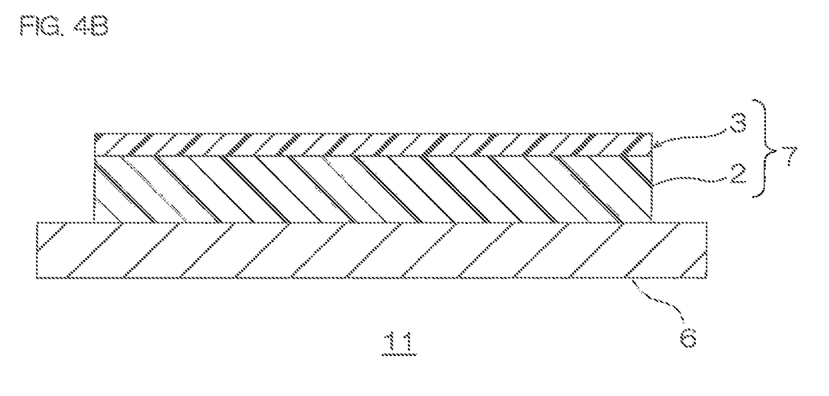
FIG. 4B shows a state in which the reinforcement sheet shown in FIG. 4A adheres to a metal plate.

As shown in FIG. 4B, to reinforce the metal plate 6 by the reinforcement sheet 7, after the release layer 5 is peeled from the core material layer 2 as needed, the exposed core material layer 2 is attached to the front surface of the metal plate 6. In this manner, the reinforcement sheet 7 is disposed on the metal plate 6.

Next, the metal plate 6 on which the reinforcement sheet 7 is disposed is heated in the same manner as the description above, and the core material resin of the core material layer 2 and if necessary, the front layer resin are cured.

In this way, the reinforcement sheet 7 reinforces the metal plate 6 by adhering to the metal plate 6. Also, a reinforcement member 11 including the reinforcement sheet 7 and the metal plate 6 that is reinforced by the reinforcement sheet 7 is produced. The reinforcement member 11 can be also produced by sequentially laminating the core material layer 2 and the front layer 3 on the metal plate 6.

In the second embodiment, the same function and effect as that of the first embodiment can be achieved.

<Reinforcement Kit>

Figure 5:
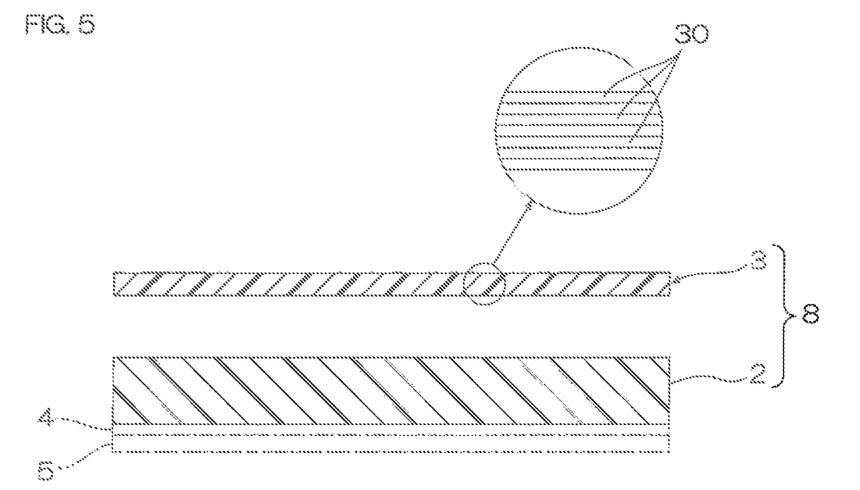
FIG. 5 shows a side cross-sectional view of a one embodiment of a reinforcement kit of the present invention.

Next, a reinforcement kit 8 as a one embodiment of a kit of the present invention is described with reference to FIG. 5. In the description of the reinforcement kit 8, the same reference numerals are provided for members and steps corresponding to each of those in the above-described first embodiment of the reinforcement sheet 1, and their detailed description is omitted.

As shown in FIG. 1A, the reinforcement sheet 1 is uniformly constituted by attaching the core material layer 2 and the front layer 3 to each other. However, as shown in FIG. 5, in the reinforcement kit 8, the core material layer 2 is separated from the front layer 3 as separate pieces. That is, the reinforcement kit 8 includes the core material layer 2 and the front layer 3 that are separate pieces. In the reinforcement kit 8, as shown by a phantom line, the adhesive layer 4 may be formed on the rear surface (the other-side surface in the thickness direction) of the core material layer 2. Also, as shown by the phantom line, the release layer 5 may be releasably attached to the adhesive layer 4.

The reinforcement kit 8 is a kit that reinforces the metal plate 6 by adhering to the metal plate 6. In the reinforcement kit 8, the core material layer 2 and the front layer 3 are simultaneously circulated and sold as one package to be simultaneously used. To reinforce the metal plate 6 by the reinforcement kit 8, after attaching the core material layer 2 to the metal plate 6, the front layer 3 is attached to the surface of the core material layer 2 at the opposite side to the metal plate 6 to be next heated in the same manner as the description above, so that the core material resin and if necessary, the front layer resin are cured.

In this way, the reinforcement kit 8 reinforces the metal plate 6 by adhering to the metal plate 6. Thus, in the reinforcement kit 8, the same function and effect as that of the first embodiment can be achieved.

MODIFIED EXAMPLES

In each of the modified examples below, the same reference numerals are provided for members and steps corresponding to each of those in the above-described first embodiment, and their detailed description is omitted.

As shown in FIG. 1A, in the reinforcement sheet 1, the front layer 3 is disposed on the front surface (one-side surface in the thickness direction) of the core material layer 2, and the adhesive layer 4 is disposed on the rear surface (the other-side surface in the thickness direction) of the core material layer 2. However, the reinforcement sheet of the present invention is not limited to this.

A substrate can be also disposed between the front layer 3 and the core material layer 2 and/or between the adhesive layer 4 and the core material layer 2. Examples of the substrate include glass cloth, carbon cloth, synthetic resin non-woven fabric (for example, polypropylene resin non-woven fabric, polyethylene resin non-woven fabric, ester resin non-woven fabric, or the like), metal foil, carbon fiber of short fiber, glass fiber of short fiber, and polyester film.

An adhesive layer that is constituted in the same manner as that of the adhesive layer 4 can be also disposed between the front layer 3 and the core material layer 2.

In the modified examples, the same function and effect as that of the first embodiment can be achieved.

The first embodiment, the second embodiment, and the modified examples can be appropriately used in combination.

Examples

Next, the present invention is further described based on Examples and Comparative Examples shown below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Examples 1 to 6

1. Preparation of Front Layer

The unidirectional fiber resin composite sheet (manufactured by TORAY INDUSTRIES INC., thickness of 0.10 mm) was prepared in the number shown in Table 1. The unidirectional fiber resin composite sheet included a plurality of carbon fibers (CFUD, basis weight of 100 g/m$^2$) that extended in the same fiber direction and were arranged in a direction perpendicular to the fiber direction so as to be generally parallel with each other, and an epoxy resin (front layer resin, content ratio of 33 mass %) that was impregnated in the plurality of carbon fibers. When the front layer resin was in a cured state, the tensile strength of each of the unidirectional fiber resin composite sheets was 2500 MPa.

The plurality of unidirectional fiber resin composite sheets were laminated so that the fiber directions of the unidirectional fiber resin composite sheets that were next to each other were perpendicular to each other. Thereafter, the plurality of unidirectional fiber resin composite sheets were pressed so as to be sandwiched from the outside in the thickness direction, thereby preparing the front layer.

2. Preparation of Core Material Layer

The following components were kneaded in accordance with the formulation shown in Table 1 with the mixing roll, thereby preparing the resin composition. The components included an unmodified epoxy resin (core material resin, uncured state, trade name: JER 828, epoxy equivalent of 184 g/eq. to 194 g/eq., manufactured by Mitsubishi Chemical Corporation); a first CTBN-modified epoxy resin (core material resin, uncured state, trade name: EPR2000, epoxy equivalent of 215 g/eq., manufactured by ADEKA CORPORATION); a second CTBN-modified epoxy resin (core material resin, uncured state, trade name: HypoxRA840, epoxy equivalent of 350 g/eq., manufactured by CVC Specialty Chemicals Inc.); a filler (calcium carbonate); a first latent curing agent (urea compound, trade name: DCMU-99, manufactured by Hodogaya Chemical Co., Ltd.); and a second latent curing agent (dicyandiamide, trade name: DDA-50, manufactured by CVC Specialty Chemicals Inc.).

Thereafter, the resin composition was sandwiched between the two release paper to be rolled by the press molding, thereby preparing the core material layer. The core material resin in the core material layer was in an uncured state. The Young's modulus of the core material layer when the core material resin is in a cured state is shown in Table 1.

3. Preparation of Adhesive Layer

Each of the following components was blended to be kneaded with the mixing roll, thereby preparing a kneaded product (thermosetting resin composition). In the kneading, first, the epoxy resin, the rubber-modified epoxy resin, the filler, and the toughness imparting agent were kneaded with the mixing roll that was heated at 120° C., and thereafter, the kneaded product was cooled to 60 to 100° C. Furthermore, the latent curing agent was added thereto to be kneaded with the mixing roll, thereby obtaining the kneaded product.

Bisphenol A epoxy resin (trade name: Epikote (registered trademark) #834, epoxy equivalent of 270 g/eq., manufactured by Mitsubishi Chemical Corporation) . . . 50 parts by mass Liquid CTBN-modified epoxy resin (trade name: EPR 1415-1, epoxy equivalent of 400 g/eq., manufactured by ADEKA CORPORATION) . . . 35 parts by mass Solid CTBN-modified epoxy resin (trade name: HypoxRK84L, epoxy equivalent of 1200 to 1800 g/eq., manufactured by CVC Specialty Chemicals Inc.) . . . 15 parts by mass Urea compound: 3-(3,4-dichlorophenyl)-1,1-dimethylurea (trade name: DCMU, manufactured by Hodogaya Chemical Co., Ltd.) . . . 2 parts by mass Dicyandiamide (trade name: DDA-50, manufactured by CVC Specialty Chemicals Inc.) . . . 5 parts by mass Hydrophobic silica: dimethyl silicone oil surface-treated silica (trade name: AEROJIL RY200, average particle size of 12 μm, manufactured by NIPPON AEROSIL CO., LTD.) . . . 2 parts by mass Glass powder: glass powder (trade name: PF70E-001, specific gravity of 2.58, average fiber length of 10.5 μm, manufactured by Nitto Boseki Co., Ltd.) . . . 20 parts by mass Next, the obtained kneaded product in a state of being sandwiched between the release paper was rolled to have a thickness of 0.1 mm by the press molding, thereby forming the thermosetting resin layer.

Thereafter, the release paper on the one-side surface of the thermosetting resin layer was peeled, and the thermosetting resin layer was attached to both surfaces of the non-woven fabric (trade name: 8004, manufactured by NISSEI Co., Ltd.) having a thickness of 130 μm by heat press (50° C.) so as to have a total thickness of the thermosetting resin layer and the substrate of 0.2 mm, thereby preparing the double-coated adhesive tape.

4. Attaching of Front Layer and Adhesive Layer to Core Material Layer

Next, the front layer was disposed on the front surface of the core material layer to be pressed so that the front layer went toward the core material layer. In this manner, the front layer was attached to the core material layer.

The double-coated adhesive tape was disposed on the rear surface of the core material layer to be pressed so that the double-coated adhesive tape went toward the core material layer. In this manner, the double-coated adhesive tape was attached to the core material layer, thereby forming the adhesive layer.

In this way, the reinforcement sheet including the core material layer, the front layer, and the adhesive layer was produced.

Example 7

The reinforcement sheet was produced in the same manner as that of Example 5, except that the unidirectional fiber resin composite sheet (manufactured by TORAY INDUSTRIES INC.) including the CFUD and the epoxy resin was changed to a unidirectional fiber resin composite sheet (trade name: E-glass E16, manufactured by NISSEI Co., Ltd., thickness of 0.12 mm) including a plurality of glass fibers (GFUD, basis weight of 160 g/m$^2$) that extended in the same fiber direction and were arranged in a direction perpendicular to the fiber direction so as to be generally parallel with each other, and an epoxy resin (front layer resin, content ratio of 25 mass %) that was impregnated in the plurality of glass fibers.

When the front layer resin was in a cured state, the tensile strength of each of the unidirectional fiber resin composite sheets was 480 MPa.

Comparative Example 1

The reinforcement sheet was produced in the same manner as that of Example 5, except that the unidirectional fiber resin composite sheet (manufactured by TORAY INDUSTRIES INC.) including the CFUD and the epoxy resin was changed to epoxy resin-impregnated glass cloth (content ratio of epoxy resin of 7 mass %, thickness of 0.2 mm), and the glass cloth was not laminated.

Comparative Example 2

The reinforcement sheet was produced in the same manner as that of Example 1, except that the filler was not added.

Comparative Example 3

The resin composition was prepared in the same manner as the above-described preparation of the core material layer, except that the content ratio of the filler was changed to 85 mass %. As a result, the filler could not be uniformly dispersed, and the core material layer could not be prepared.

Comparative Example 4

The reinforcement sheet was produced in the same manner as that of Comparative Example 2, except that a foaming agent (trade name: NT-N, manufactured by EIWA CHEMICAL IND. CO., LTD.) was further added.

Comparative Example 5

The front layer obtained by laminating the unidirectional fiber resin composite sheet (manufactured by TORAY INDUSTRIES INC.) including the CFUD and the epoxy resin in the number shown in Table 1 was defined as the reinforcement sheet. That is, the reinforcement sheet of Comparative Example 5 consisted of the plurality of unidirectional fiber resin composite sheets, and did not include the core material layer.

Comparative Example 6

The front layer obtained by laminating the unidirectional fiber resin composite sheet (trade name: E-glass E16, manufactured by NISSEI Co., Ltd.) including the GFUD and the epoxy resin in the number shown in Table 1 was defined as the reinforcement sheet. That is, the reinforcement sheet of Comparative Example 6 consisted of the plurality of unidirectional fiber resin composite sheets, and did not include the core material layer.

Evaluation (Measurement of Maximum Bending Testing Force)

Each of the reinforcement sheets of Examples and Comparative Examples was cut into a rectangular shape having a width of 25 mm and a length of 150 mm.

Next, oil on the surface of the metal plate (SPCC, thickness of 0.8 mm, width of 25 mm, length of 150 mm) was removed with toluene, and thereafter, each of the reinforcement sheets was disposed on the metal plate.

Next, the metal plate on which each of the reinforcement sheets was disposed was pressed with a flat plate hot press heated at 180° C. for 150 seconds. Then, the metal plate was heated at 180° C. for 30 minutes with a hot air dryer, so that the adhesive, the core material resin, and the front layer resin were cured. In this manner, each of the reinforcement sheets adhered to the metal plate.

Thereafter, the maximum bending testing force (the maximum value of a load in a bending test) of each of the obtained samples was measured under the following test conditions with a bending testing machine (trade name: Technograph TG-5 kN (load cell: TC3D-2 kN), manufactured by Minebea Co., Ltd.).

Test conditions: three-point bending method, distance between supporting points=100 mm, test rate of 5 mm/min, room temperature (23° C.) and 100° C.

The bending strength at room temperature (23° C.) was evaluated based on the following criteria, and the bending strength at 100° C. was evaluated based on the following criteria.

Bad: the maximum bending testing force at room temperature (23° C.) was below 400 N
Fair: the maximum bending testing force at room temperature (23° C.) was 400 N or more and below 500 N
Good: the maximum bending testing force at room temperature (23° C.) was 500 N or more and below 600 N
Excellent: the maximum bending testing force at room temperature (23° C.) was 600 N or more
Bad: the maximum bending testing force at 100° C. was below 150 N
Fair: the maximum bending testing force at 100° C. was 150 N or more and below 200 N
Good: the maximum bending testing force at 100° C. was 200 N or more and below 400 N
Excellent: the maximum bending testing force at 100° C. was 400 N or more The results are shown in Table 1.

TABLE 1

| | no. | | | unit | Ex. 1 | Ex. 2 | Ex. 3 | Ex. 4 | Ex. 5 | Ex. 6 | Ex. 7 |
|---|---|---|---|---|---|---|---|---|---|---|---|
| Front Layer | Fiber | | | — | CFUD | CFUD | CFUD | CFUD | CFUD | CFUD | GFUD |
| | Epoxy Resin | | | mass % | 33 | 33 | 33 | 33 | 33 | 33 | 25 |
| | Numbers of Unidirectional Fiber Resin Composite Sheet | | | — | 4 | 4 | 4 | 4 | 4 | 4 | 4 |
| | Thickness | | | mm | 0.40 | 0.40 | 0.40 | 0.40 | 0.40 | 0.40 | 0.48 |
| Core Material Layer | Formulation | Unmodified Epoxy Resin | jER 828 | parts by mass | 40 | 40 | 40 | 40 | 40 | 40 | 40 |
| | | CTBN-Modified Epoxy Resin | EPR 2000 Hypox RA840 | | 23 37 | 23 37 | 23 37 | 23 37 | 23 37 | 23 37 | 23 37 |
| | | Filer | CaCO$_3$ | | 19 | 46 | 88 | 160 | 321 | 427 | 321 |
| | | | | mass % | 15% | 30% | 45% | 60% | 75% | 80% | 75% |
| | | Latent Curing Agent | DCNU-99 DOA-50 | parts by mass | 2 5 | 2 5 | 2 5 | 2 5 | 2 5 | 2 5 | 2 5 |
| | | Foaming Agent | NT-N | | — | — | — | — | — | — | — |
| | Young's Modulus | | | MPa | 673 | 1,250 | 1,866 | 2,375 | 2,554 | 2,796 | 2,554 |
| | Thickness | | | mm | 1.0 | 1.2 | 1.2 | 1.2 | 1.2 | 1.2 | 1.2 |
| | Thickness of Core Material Layer/Thickness of Front Layer | | | — | 2.5 | 3.0 | 3.0 | 3.0 | 3.0 | 3.0 | 2.5 |
| Adhesive Layer | Thickness | | | mm | 0.2 | 0.2 | 0.2 | 0.2 | 0.2 | 0.2 | 0.25 |
| Metal Plate | Thickness | | | mm | 0.8 | 0.8 | 0.8 | 0.8 | 0.8 | 0.8 | 0.8 |
| Evaluation | Bending Test (Measurement at Normal Temperature) | | Maximum Value | N | 547 | 517 | 623 | 677 | 646 | 700 | 429 |
| | | | Fracture Mode | — | | | | Fracture of Front Layer | | | |
| | | | Evaluation | — | Good | Good | Excellent | Excellent | Excellent | Excellent | Fair |
| | Bending Test (Measurement at 100° C.) | | Maximum Value | N | 177 | 313 | 382 | 402 | 426 | 480 | 212 |
| | | | Fracture Mode | — | | | | No Fracture (Plastic Deformation) | | | |
| | | | Evaluation | — | Fair | Good | Good | Excellent | Excellent | Excellent | Good |

| | no. | | | unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Front Layer | Fiber | | | — | Glass Cloth | CFUD | — | CFUD | CFUD | GFUD |
| | Epoxy Resin | | | mass % | 7 | 33 | — | 33 | 33 | 25 |
| | Numbers of Unidirectional Fiber Resin Composite Sheet | | | — | 1 | 4 | — | 4 | 12 | 10 |
| | Thickness | | | mm | 0.20 | 0.40 | — | 0.40 | 1.20 | 1.20 |
| Core Material Layer | Formulation | Unmodified Epoxy Resin | jER 828 | parts by mass | 40 | 40 | 40 | 40 | — | — |
| | | CTBN-Modified Epoxy Resin | EPR 2000 Hypox RA840 | | 23 37 | 23 37 | 23 37 | 23 37 | — | — |
| | | Filer | CaCO$_3$ | | 321 | — | 605 | — | — | — |
| | | | | mass % | 75% | 0% | 85% | 0% | — | — |

TABLE 1-continued

| | | | | | | | | | |
|---|---|---|---|---|---|---|---|---|---|
| | | Latent Curing Agent | DCNU-99 | parts by mass | 2 | 2 | 2 | 2 | — | — |
| | | | DOA-50 | | 5 | 5 | 5 | 5 | — | — |
| | | Foaming Agent | NT-N | | — | — | — | 0.8 | — | — |
| | Young's Modulus | | | MPa | 2,554 | 574 | Fabrication Failure | 577 | — | — |
| | Thickness | | | mm | 1.4 | 1.2 | — | 0.85 | — | — |
| | Thickness of Core Material Layer/Thickness of Front Layer | | | | — | 7.0 | 3.0 | — | 2.1 | — |
| Adhesive Layer | Thickness | | | mm | 0.2 | 0.2 | — | 0.2 | 0.2 | 0.2 |
| Metal Plate | Thickness | | | mm | 0.8 | 0.8 | — | 0.8 | 0.8 | 0.8 |
| Evaluation | Bending Test (Measurement at Normal Temperature) | | Maximum Value | N | 164 | 544 | — | 395 | 649 | 452 |
| | | | Fracture Mode | — | — | Fracture of Front Layer | — | — | Fracture of Front Layer | |
| | | | Evaluation | — | Bad | Good | — | Bad | Excellent | Fair |
| | Bending Test (Measurement at 100° C.) | | Maximum Value | N | — | 140 | — | — | 483 | 270 |
| | | | Fracture Mode | — | — | Compression Fracture of Core Material | — | — | No Fracture (Plastic Deformation) | |
| | | | Evaluation | — | — | Bad | — | — | Good | Good |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The reinforcement sheet and the reinforcement kit of the present invention can be applied for reinforcement of a metal plate used in various industrial products, and can be, for example, preferably used for reinforcement of a metal plate used in transportation machines, a metal plate used in household electric appliances, or the like. The reinforcement member of the present invention can be applied for various industrial products, and can be, for example, preferably used for transportation machines, household electric appliances, or the like.

DESCRIPTION OF REFERENCE NUMERALS

1 Reinforcement sheet
2 Core material layer
3 Front layer
4 Adhesive layer
6 Metal plate
7 Reinforcement sheet
8 Reinforcement kit
10 Reinforcement member
11 Reinforcement member
20 Filler
21 Core material resin
30 Unidirectional fiber resin composite sheet

The invention claimed is:

1. A reinforcement sheet for reinforcing a metal plate by adhering to the metal plate, comprising:
a core material layer containing:
a resin and
a filler, and
a front layer disposed at one side in a thickness direction of the core material layer, wherein
the core material layer has a thickness of 1 mm or more,
a content ratio of the filler in the core material layer is 15 mass % or more and below 85 mass %, and
the front layer is obtained by laminating a plurality of unidirectional fiber resin composite sheets.

2. The reinforcement sheet according to claim 1, wherein a Young's modulus of the core material layer is 600 MPa or more.

3. The reinforcement sheet according to claim 1, wherein each of the plurality of unidirectional fiber resin composite sheets contains a carbon fiber or a glass fiber, and a thermosetting resin.

4. The reinforcement sheet according to claim 1, wherein a ratio of a thickness of the core material layer to a thickness of the front layer is 0.01 or more and 50 or less.

5. The reinforcement sheet according to claim 1 further comprising:
an adhesive layer disposed at the other side in the thickness direction of the core material layer.

6. A reinforcement member comprising:
the reinforcement sheet according to claim 1, and
a metal plate reinforced by the reinforcement sheet.

7. The reinforcement sheet according to claim 1, wherein the plurality of unidirectional fiber resin composite sheets are laminated in the thickness direction,
each of the plurality of unidirectional fiber resin composite sheets contains a plurality of fibers,
each of the plurality of fibers in a first unidirectional fiber resin composite sheet extends in a first fiber direction that is the same direction perpendicular to the thickness direction,
wherein a plurality of fibers in a second unidirectional fiber resin composite sheet are arranged in a direction perpendicular to the first fiber direction, and
the fiber directions of the unidirectional fiber resin composite sheets that are next to each other cross each other.

8. The reinforcement sheet according to claim 1, wherein the filler includes calcium carbonate or glass balloon.

* * * * *